United States Patent
Huang et al.

(10) Patent No.: US 10,992,481 B2
(45) Date of Patent: Apr. 27, 2021

(54) TWO-DIMENSIONAL CODE GENERATION METHOD, APPARATUS, DATA PROCESSING METHOD, APPARATUS, AND SERVER

(71) Applicant: Advanced New Technologies Co., Ltd., Grand Cayman (KY)

(72) Inventors: Qi Huang, Hangzhou (CN); Shengbo Zhao, Hangzhou (CN); Hui Liao, Hangzhou (CN); Zhiwei Wang, Hangzhou (CN); Yawen Wei, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 17/086,105

(22) Filed: Oct. 30, 2020

(65) Prior Publication Data

US 2021/0051024 A1     Feb. 18, 2021

Related U.S. Application Data

(63) Continuation of application No. PCT/CN2019/095331, filed on Jul. 10, 2019.

(30) Foreign Application Priority Data

Aug. 24, 2018   (CN) .......................... 201810974011.8

(51) Int. Cl.
   *G06F 21/00*     (2013.01)
   *H04L 9/32*      (2006.01)
   (Continued)

(52) U.S. Cl.
   CPC ............ *H04L 9/3247* (2013.01); *G06F 21/36* (2013.01); *H04L 9/0825* (2013.01); *H04L 9/0863* (2013.01); *H04L 9/3297* (2013.01)

(58) Field of Classification Search
   None
   See application file for complete search history.

(56) References Cited

U.S. PATENT DOCUMENTS 7,194,483 B1 *   3/2007   Mohan ................... G06F 16/30
                                                          707/600
9,129,269 B2 *   9/2015   Dai ..................... G06Q 20/3829
                         (Continued)

FOREIGN PATENT DOCUMENTS

CN      102779263       11/2012
CN      103295046       9/2013
                         (Continued)

OTHER PUBLICATIONS

Kobayashi, Tetsuji et al. A student ID system using a cell phone and its evaluation. IEEE International Workshop on Wireless and Mobile Technologies in Education (WMTE'05). https://ieeexplore.ieee.org/stamp/stamp.jsp?tp=&arnumber=1579230 (Year: 2005).*
(Continued)

*Primary Examiner* — Jeremiah L Avery
(74) *Attorney, Agent, or Firm* — Fish & Richardson P.C.

(57) ABSTRACT

A computer-implemented method includes receiving, by an electronic device, a two-dimensional code generation request from a user operating the electronic device, the electronic device comprising secure element; obtaining, by the electronic device, two-dimensional code generation data, wherein the two-dimensional code generation data comprises account data of the user and timestamp data of the electronic device; obtaining, by the electronic device, signature data based on a predetermined signature algorithm stored in the secure element; and generating, by the electronic device, a target two-dimensional code based on the two-dimensional code generation data and the signature data.

20 Claims, 3 Drawing Sheets

(51) Int. Cl.
*G06F 21/36* (2013.01)
*H04L 9/08* (2006.01)

(56) References Cited

U.S. PATENT DOCUMENTS

| | | | |
|---|---|---|---|
| 9,922,332 B2* | 3/2018 | Sant'Anselmo | G06Q 20/10 |
| 2005/0154701 A1* | 7/2005 | Parunak | G06F 16/367 |
| 2007/0260558 A1* | 11/2007 | Look | G06Q 20/20 |
| | | | 705/76 |
| 2009/0261158 A1 | 10/2009 | Lawson | |
| 2012/0138679 A1* | 6/2012 | Doyle | G06K 19/06037 |
| | | | 235/380 |
| 2014/0258127 A1 | 9/2014 | Chava | |

FOREIGN PATENT DOCUMENTS

| | | |
|---|---|---|
| CN | 104766204 | 7/2015 |
| CN | 105024824 | 11/2015 |
| CN | 106100850 | 11/2016 |
| CN | 107146124 | 9/2017 |
| CN | 107194695 | 9/2017 |
| CN | 108023732 | 5/2018 |
| CN | 108256863 | 7/2018 |
| CN | 108256869 | 7/2018 |
| CN | 109409472 | 3/2019 |
| TW | 201610742 | 3/2016 |

OTHER PUBLICATIONS

Starnberger, Guenther et al. QR-TAN: Secure Mobile Transaction Authentication. 2009 International Conference on Availability, Reliability and Security. https://ieeexplore.ieee.org/stamp/stamp.jsp?tp=&arnumber=5066529 (Year: 2009).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2019/095331, dated Sep. 27, 2019, 9 pages (with partial English translation).

* cited by examiner

TWO-DIMENSIONAL CODE GENERATION METHOD, APPARATUS, DATA PROCESSING METHOD, APPARATUS, AND SERVER

CROSS-REFERENCE TO RELATED APPLICATIONS

This application is a continuation of PCT Application No. PCT/CN2019/095331, filed on Jul. 10, 2019, which claims priority to Chinese Patent Application No. 201810974011.8, filed on Aug. 24, 2018, and each application is hereby incorporated by reference in its entirety.

TECHNICAL FIELD

The present specification relates to the field of computer technologies, and in particular, to two-dimensional code generation methods, apparatuses, data processing methods, apparatuses, and servers.

BACKGROUND

A two-dimensional code records data symbol information by using black and white geometric figures formed on a plane based on a specific rule. With the development of science and technology, the two-dimensional code has been widely applied. For example, a payment and collection transaction can be completed by scanning a two-dimensional code for collecting a payment and a two-dimensional code for making a payment. However, two-dimensional code data is stored in plaintext, and is easily tampered with and attacked by attackers.

SUMMARY

Embodiments of the present specification provide two-dimensional code generation methods, apparatuses, data processing methods, apparatuses, and servers.

According to a first aspect, some embodiments of the present specification provide a two-dimensional code generation method, applied to an electronic device, where a secure element is disposed in the electronic device, and the method includes: obtaining two-dimensional code generation data when a two-dimensional code generation request is received, where the two-dimensional code generation data includes account data of a user corresponding to the electronic device and timestamp data of the electronic device; obtaining signature data based on a predetermined signature algorithm stored in the secure element; and generating a target two-dimensional code based on the two-dimensional code generation data and the signature data.

According to a second aspect, some embodiments of the present specification provide a data processing method, where the data processing method includes: receiving two-dimensional code scanning data obtained by scanning a target two-dimensional code through a target electronic device, where the target two-dimensional code is a two-dimensional code generated by using the method according to any one of claims 1 to 5, and the two-dimensional code scanning data includes signature data and two-dimensional code generation data for generating the target two-dimensional code; and verifying the signature data based on a signature method of the signature data to obtain a verification result.

According to a third aspect, some embodiments of the present specification provide a two-dimensional code generation apparatus, where a secure element is disposed in the two-dimensional code generation apparatus, and the two-dimensional code generation apparatus includes: a two-dimensional code generation data acquisition module, configured to obtain two-dimensional code generation data when a two-dimensional code generation request is received, where the two-dimensional code generation data includes account data of a user corresponding to the electronic device and timestamp data of the electronic device; a signature data acquisition module, configured to obtain signature data based on a predetermined signature algorithm stored in the secure element; and a two-dimensional code generation module, configured to generate a target two-dimensional code based on the two-dimensional code generation data and the signature data.

According to a fourth aspect, some embodiments of the present specification provide a data processing apparatus, including: a receiving module, configured to receive two-dimensional code scanning data obtained by scanning a target two-dimensional code through a target electronic device, where the target two-dimensional code is a two-dimensional code generated by using the method according to any one of claims 1 to 5, and the two-dimensional code scanning data includes signature data and two-dimensional code generation data for generating the target two-dimensional code; and a processing module, configured to verify the signature data based on a signature method of the signature data to obtain a verification result.

According to a fifth aspect, some embodiments of the present specification provide a two-dimensional code generation apparatus, including a memory, a processor, and a computer program that is stored in the memory and can run on the processor, where the processor performs the steps of the two-dimensional code generation method in the first aspect.

According to a sixth aspect, some embodiments of the present specification provide a server, including a memory, a processor, and a computer program that is stored in the memory and can run on the processor, where the processor performs the steps of the data processing method in the second aspect.

According to a seventh aspect, some embodiments of the present specification provide a computer-readable storage medium, where the computer-readable storage medium stores a computer program, and when the program is executed by a processor, the steps of any one of the methods are implemented.

Beneficial effects of the embodiments of the present specification are as follows:

In the embodiments of the present specification, the two-dimensional code generation data is obtained when the two-dimensional code generation request is received, where the two-dimensional code generation data includes the account data of the user corresponding to the electronic device and the timestamp data of the electronic device; the signature data is obtained based on the predetermined signature algorithm stored in the secure element; and the target two-dimensional code is generated based on the two-dimensional code generation data and the signature data. In the previous solutions, the secure element can provide independent running space, which ensures data security; the digital signature data is obtained by using the predetermined signature algorithm stored in the secure element; and the target two-dimensional code is generated based on the two-dimensional code generation data and the digital signature data, which ensures security of the target two-dimensional code. In addition, only when verification performed by a certification authority on the target two-dimensional code succeeds, it indicates that the target two-dimensional code is not tampered with. Therefore, data transmission security is effectively ensured.

BRIEF DESCRIPTION OF DRAWINGS

Other advantages and benefits become clear to a person of ordinary skill in the art by reading the detailed description of the preferred embodiments below. The accompanying drawings are merely intended to illustrate the preferred embodiments, and are not intended to limit the present specification. In addition, in the accompanying drawings, the same reference numerals represent the same parts. In the accompanying drawings.

DESCRIPTION OF EMBODIMENTS

To better understand the previous technical solutions, the following describes in detail the technical solutions of the embodiments of the present specification by using the accompanying drawings and specific embodiments. It should be understood that the embodiments of the present specification and specific features in the embodiments are detailed description of the technical solutions of the embodiments of the present specification, and constitute no limitation on the technical solutions of the present specification. The embodiments of the present specification and the technical features in the embodiments can be combined with each other provided that there is no conflict.

Figure 1:
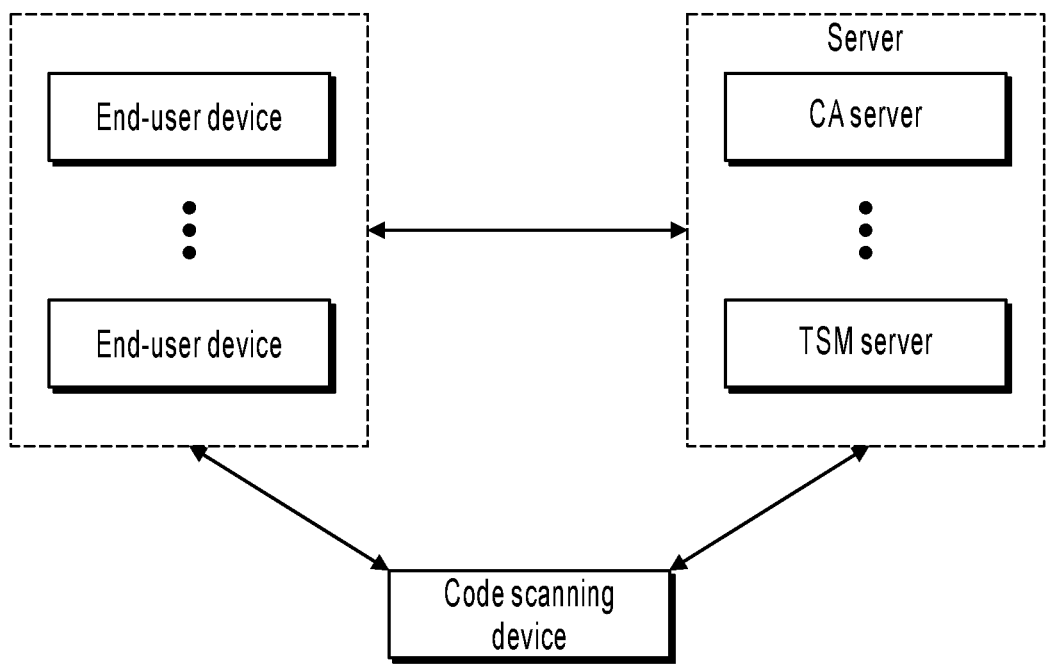
FIG. 1 is a schematic diagram illustrating an application scenario of a data processing method, according to some embodiments of the present specification.

According to a first aspect, some embodiments of the present specification provide a two-dimensional code generation method. FIG. 1 is a schematic diagram illustrating an application scenario of a data processing method, according to some embodiments of the present specification. In FIG. 1, an end-user device can be a device such as a payment tool or a two-dimensional code generator. There can be multiple end-user devices, and each end-user device is communicably coupled to a server. A secure element (SE) can be disposed in each end-user device, and two-dimensional code generation data is obtained by using the secure element. The secure element provides running space isolated from a microcontroller unit (MCU) in the device, and therefore a program and data running or stored on the secure element cannot be read or tampered with by an attacker, to ensure data security. A display unit can also be disposed in the end-user device, and can display a two-dimensional code.

A code scanning device can be a device such as a mobile phone or a tablet computer, and is configured to scan a two-dimensional code displayed by the end-user device, to obtain a code scanning result. The code scanning device can further send the code scanning result to the server, so that the server verifies the code scanning result to determine whether the two-dimensional code is tampered with.

The server can be a certification authority (CA) server, a trusted service management (TSM) server, etc. The CA server can verify received scanning data, and the TSM server can manage the secure element in the end-user device, for example, complete initialization of the secure element and network access of the end-user device.

Figure 2:
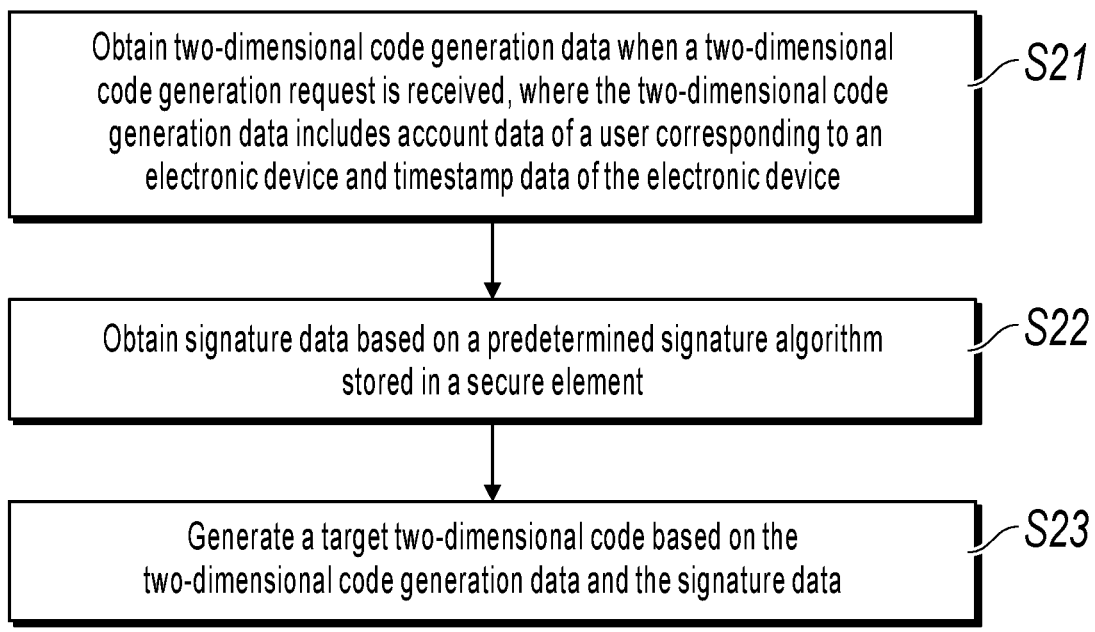
FIG. 2 is a flowchart illustrating a two-dimensional code generation method, according to a first aspect of the embodiments of the present specification.

FIG. 2 is a flowchart illustrating a two-dimensional code generation method, according to some embodiments of the present specification. The method is applied to an electronic device, and a secure element is disposed in the electronic device. The method includes the following steps.

Step S21: Obtain two-dimensional code generation data when a two-dimensional code generation request is received, where the two-dimensional code generation data includes account data of a user corresponding to the electronic device and timestamp data of the electronic device.

In some embodiments of the present specification, the electronic device can be a device such as a payment tool or a two-dimensional code generator, and a secure element is disposed in the electronic device. A two-dimensional code can be a collection code, an order code, a payment code, etc. The two-dimensional code generation request can be a request initiated at a specific time or a request generated through triggering by an operation of the user. In some embodiments, the electronic device is a payment tool, the two-dimensional code is a collection code, and a collection code generation request can be sent by using a regular update task, for example, a collection code update request is sent every other minute. In other embodiments the payment tool can be provided with an operation button for displaying a two-dimensional code, and the two-dimensional code generation request is sent when the user presses the operation button. Certainly, the two-dimensional code generation request can be sent in other ways. For example, after the current two-dimensional code is scanned, the two-dimensional code generation request can be sent, to update the two-dimensional code.

In some embodiments of the present specification, the two-dimensional code generation data can be stored in the secure element of the electronic device, or can be stored in storage space other than the secure element. The two-dimensional code generation data includes the account data of the user corresponding to the electronic device and the timestamp data of the electronic device. Certainly, the two-dimensional code generation data can further include other data. Implementations are not limited here. The timestamp data can indicate time information of the electronic device, and can mark a two-dimensional code generation time. Because the timestamp data is changed in real time, the two-dimensional code generation data is also dynamic. Therefore, a two-dimensional code pattern obtained based on the two-dimensional code generation data also dynamically changes. It should be understood that each electronic device can be bound to an account of a user, and account data of the user can be bank account data, ALIPAY account data, etc. In some embodiments, when the two-dimensional code is a collection code, the account data of the user can be a collection account number of the user.

Step S22: Obtain signature data based on a predetermined signature algorithm stored in the secure element.

In some embodiments of the present specification, before the electronic device is shipped, the predetermined signature algorithm can be written to the secure element. The predetermined signature algorithm can be selected based on actual needs, for example, a public key infrastructure (PM) algorithm or an HMAC-based one-time password (HOTP) algorithm. Implementations are not limited in some embodiments of the present specification.

It should be understood that different signature data can be obtained by different signature algorithms. In addition, due to features of the signature algorithm, different signature data can be obtained by using the same signature algorithm in digital signature addition processes. For example, when the predetermined signature algorithm is an elliptic curve public key cryptography algorithm, signature data obtained each time dynamically changes.

The SE can provide secure space for data. Therefore, in some embodiments, the digital signature addition process can be completed in the SE to generate the signature data.

Step S23: Generate a target two-dimensional code based on the two-dimensional code generation data and the signature data.

After the two-dimensional code generation data and the signature data are obtained, the data is converted into a two-dimensional code image to generate the target two-dimensional code. In some embodiments, the electronic device can store a template for converting data into a two-dimensional code image, for example, two-dimensional code version information and two-dimensional code structure composition, and the target two-dimensional code can be obtained by adding the two-dimensional code generation data and the signature data to a data area of the two-dimensional code image as data content of the two-dimensional code.

Optionally, before the signature data is obtained based on the predetermined signature algorithm stored in the secure element, the method further includes: obtaining to-be-signed data; and the obtaining signature data based on a predetermined signature algorithm stored in the secure element includes: obtaining the signature data by adding a digital signature to the to-be-signed data based on the predetermined signature algorithm.

In some embodiments of the present specification, the to-be-signed data can be set based on actual needs. The to-be-signed data can be stored in the secure element, or can be obtained through data processing. In some embodiments, the to-be-signed data can be predetermined data, and can be directly read during a signature addition operation.

In other embodiments, digest data corresponding to the two-dimensional code generation data is generated based on the two-dimensional code generation data, and the digest data is the to-be-signed data. In the present embodiment, when the two-dimensional code generation data includes a relatively large data amount, to reduce a digital signature calculation amount, the two-dimensional code generation data can be processed first. For example, the digest data corresponding to the two-dimensional code generation data is obtained by performing a hash operation on the two-dimensional code generation data, and then a digital signature is added to the digest data. Certainly, the digest data can be obtained in other ways. Implementations are not limited here.

Optionally, when the predetermined signature algorithm is a public key infrastructure-based signature algorithm, the obtaining the signature data by adding a digital signature to the to-be-signed data based on the predetermined signature algorithm includes: obtaining a private key generated by the secure element; and obtaining the signature data by adding the digital signature to the to-be-signed data based on the private key.

In some embodiments of the present specification, the electronic device can perform a network access operation when being put into use. In the process of accessing a network by the device, the electronic device can send a certificate signing request (CSR) instruction to a TSM server. The instruction includes an identifier of the SE disposed in the electronic device to uniquely indicate the electronic device that sends the request. The TSM server sends the CSR instruction to the electronic device, so that the SE in the electronic device generates a public-private key pair, and associates the public-private key pair with the identifier of the SE. After the SE generates the public-private key pair and associates the public-private key pair with the identifier of the SE, the TSM server requests a CA certificate from a certification authority (CA), the CA generates a certificate file based on a public key generated by the SE and other information, stores the certificate, and returns certificate data to the TSM server, and the TSM server sends a certificate write instruction to the electronic device, and the electronic device stores the certificate in the SE to complete the process of accessing a network by the device. The SE stores the private key and the certificate.

When the SE adds a signature to the to-be-signed data by using the private key, the SE can add a signature to the to-be-signed data by directly reading the private key. Correspondingly, when verifying the signature data, the CA can determine, based on the identifier of the SE, the public key generated by the SE, and verify the signature data by using the public key.

In some embodiments, the to-be-signed data is digest information obtained by performing a hash operation on the two-dimensional code generation data. The SE adds a digital signature to the digest information by using the private key to obtain the signature data, and converts the two-dimensional code generation data and the signature data into the target two-dimensional code. After scanning the target two-dimensional code, a code scanning device obtains a code scanning result. The code scanning result includes the two-dimensional code generation data and the signature data. The code scanning device sends the code scanning result to the CA. The CA obtains first digest data by performing a hash operation on the two-dimensional code generation data, identifies the public key corresponding to the private key by using the identifier of the SE, and verifies the signature data by using the public key to obtain second digest data. When the first digest data is the same as the second digest data, it indicates that the target two-dimensional code is generated by the electronic device corresponding to the identifier of the SE, and is not tampered with.

Optionally, when the predetermined signature algorithm is an encryption-based one-time signature algorithm, the obtaining signature data based on a predetermined signature algorithm stored in the secure element includes: obtaining a one-time encryption password based on a shared key stored in the secure element, where the one-time encryption password is the signature data.

In some embodiments of the present specification, when the predetermined signature algorithm is the encryption-based one-time signature algorithm, the signature algorithm can be an HTOP algorithm. The SE can store the shared key, and the key is shared by the SE and an authentication server. A one-time encryption password can be generated based on the shared key. In some embodiments, a counter is disposed in the electronic device, and the one-time encryption password is obtained by performing a hash-based message authentication code (HMAC) operation based on the shared key and a value of the counter. It should be understood that a different one-time encryption password is generated each time, and therefore security of each signature addition process can be ensured. In addition, on the authentication server, a password is also generated based on the shared key and the value of the counter. When the password is the same as the one-time encryption password generated by the SE, it indicates that data is not tampered with.

When the signature data is the one-time encryption password, the target two-dimensional code is generated based on the two-dimensional code generation data and the one-time encryption password.

Optionally, after the signature data is obtained by adding the digital signature to the to-be-signed data based on the private key, the method further includes: generating a one-time encryption password based on a shared key stored in the secure element; and the generating a target two-dimensional code based on the two-dimensional code generation data and the signature data includes: generating the target two-dimensional code based on the two-dimensional code generation data, the signature data, and the one-time encryption password.

In some embodiments of the present specification, to enhance data security, the digital signature can be added to the to-be-signed data by using a private key stored in the SE to obtain the signature data, and then the two-dimensional code generation data and the signature data can be encrypted and protected by using the one-time encryption password. In the process of generating the target two-dimensional code, the two-dimensional code generation data, the signature data, and the one-time encryption password are processed and converted into image information of the target two-dimensional code. Correspondingly, when receiving data of the target two-dimensional code, the authentication server decrypts the data of the target two-dimensional code based on the one-time encryption password, and then verifies the signature data based on a public key.

To generate the target two-dimensional code, data conversion can be performed based on predetermined two-dimensional code information in the electronic device. The two-dimensional code information can include two-dimensional code version information, two-dimensional code structure information, etc. In some embodiments, the two-dimensional code generation data and the signature data can be encoded to obtain a data codeword sequence, then steps such as error correction coding, blocked processing, and matrix construction are performed to obtain a final complete target sequence, and the complete target sequence is added to a corresponding two-dimensional code matrix area to obtain a target two-dimensional code image.

Figure 3:
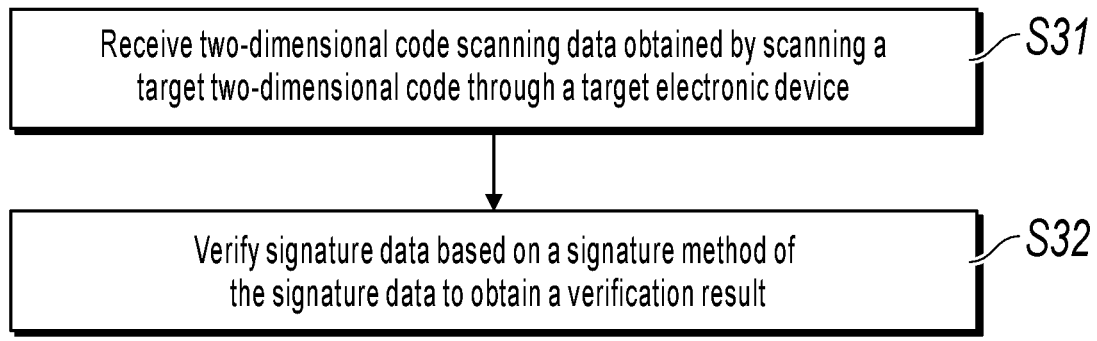
FIG. 3 is a flowchart illustrating a data processing method, according to a second aspect of the embodiments of the present specification.

According to a second aspect, some embodiments of the present specification provide a data processing method. The data processing method can be applied to a server. As shown in FIG. 3, the data processing method includes the following steps.

Step S31: Receive two-dimensional code scanning data obtained by scanning a target two-dimensional code through a target electronic device, where the target two-dimensional code is a two-dimensional code generated by using the two-dimensional code generation method provided in the first aspect of the embodiments of the present specification, and the two-dimensional code scanning data includes signature data and two-dimensional code generation data for generating the target two-dimensional code.

In some embodiments of the present specification, the target electronic device can be a device that can scan a two-dimensional code, for example, a mobile phone or a tablet computer. The target two-dimensional code is a two-dimensional code generated by using the two-dimensional code generation method provided in the first aspect of the embodiments of the present specification. After scanning the target two-dimensional code, the target electronic device can convert the target two-dimensional code from image information into a codeword sequence, and process the codeword sequence to obtain the signature data and the two-dimensional code generation data corresponding to the target two-dimensional code. The two-dimensional code scanning data can be the codeword sequence or the two-dimensional code generation data and the signature data obtained after processing, or can be other forms of data. Implementations are not limited here. The target electronic device sends the obtained two-dimensional code scanning data to the server. In some embodiments, the target electronic device sends the two-dimensional code scanning data to a certification authority (CA) server.

Step S32: Verify the signature data based on a signature method of the signature data to obtain a verification result.

The signature data can be generated by using different signature algorithms such as a public key infrastructure (PM) algorithm or an HMAC-based one-time password (HOTP) algorithm. Different signature methods correspond to different verification methods. In some embodiments, when the signature method is a public key infrastructure-based signature method, the verifying the signature data based on a signature method of the signature data to obtain a verification result includes: verifying the signature data based on a public key corresponding to the signature data to obtain the verification result. In other embodiments, when the signature method is an encryption-based one-time signature method, the verifying the signature data based on a signature method of the signature data to obtain a verification result includes: obtaining a target one-time encryption password based on a shared key corresponding to the signature data; and verifying the signature data based on the target one-time encryption password to obtain the verification result. The two verification methods are described in the two-dimensional code generation method provided in the first aspect of the embodiments of the present specification, and are not described here.

In addition, when the two-dimensional code scanning data indicates that the data includes both one-time encryption information and signature information, the two-dimensional code scanning data is decrypted based on the target one-time encryption password, and the decrypted data is verified by using a corresponding verification method.

Optionally, after the two-dimensional code scanning data obtained by scanning the target two-dimensional code through the target electronic device, the method further includes: obtaining target timestamp data for receiving the two-dimensional code scanning data; obtaining initial timestamp data in the two-dimensional code generation data; and determining whether the two-dimensional code is valid based on a target time difference between the target timestamp data and the initial timestamp data and a predetermined time difference, where it is determined that the target two-dimensional code is valid when the target time difference is less than or equal to the predetermined time difference, or it is determined that the target two-dimensional code is invalid when the target time difference is greater than the predetermined time difference.

To ensure data security, valid duration is set for the two-dimensional code in some embodiments of the present specification. That is, the two-dimensional code is valid within the valid duration, and the two-dimensional code is invalid when the valid duration is reached. In some embodiments of the present specification, the two-dimensional code generation data includes the initial timestamp data for generating the two-dimensional code. Based on the target timestamp data for receiving the two-dimensional code scanning data by the server, the target time difference between the target timestamp data and the initial timestamp data can represent duration of the target two-dimensional code. The predetermined time difference is used to represent the valid duration of the two-dimensional code, and can be set based on actual needs, for example, 30 s or 1 min. When the target time difference is greater than the predetermined time difference, it indicates that the target two-dimensional code has expired and the target two-dimensional code is invalid. Otherwise, it indicates that the target two-dimensional code is valid.

Optionally, when the target two-dimensional code is a collection code, after the verification result is obtained, the method further includes: obtaining account data in the two-dimensional code generation data when the verification result indicates a verification success; and updating an amount in the account data based on a collection amount corresponding to the collection code.

To better understand the method provided in the embodiments of the present specification, an example in which the two-dimensional code is a collection code is used below to describe the process of generating and scanning the target two-dimensional code. In the present embodiment, the electronic device is a payment tool, the two-dimensional code is a collection code, the account data in the two-dimensional code generation data is collection account data of a user who uses the payment tool, and an SE in the electronic device stores a PM algorithm. The target electronic device is a mobile phone for code scanning. The server includes a certification authority (CA) server and a transaction platform. The transaction platform is used to manage the account data of the user.

When receiving a two-dimensional code generation request, the payment tool obtains the collection account data and timestamp data of the payment tool. The SE adds a digital signature to the collection account data and the timestamp data by using the PM algorithm and a private key to generate signature data. The collection account data, the timestamp data, and the signature data are processed, and are converted into a target two-dimensional code, and the target two-dimensional code is displayed on the payment tool.

When scanning the target two-dimensional code on the payment tool, the mobile phone obtains two-dimensional code scanning data (including the collection account data, the timestamp data, and the signature data). In addition, the mobile phone can jump to a payment page, the user of the mobile phone adds a payment amount on the payment page, and after addition, the mobile phone sends the two-dimensional code scanning data and the payment amount to the CA server.

The CA server determines whether the target two-dimensional code is valid based on the timestamp data, and verifies the signature data based on a public key corresponding to the payment tool when the target two-dimensional code is valid. When the verification succeeds, the collection account data and the payment amount can be sent to the transaction platform, and the transaction platform updates a total amount in a collection account based on the payment amount.

Figure 4:
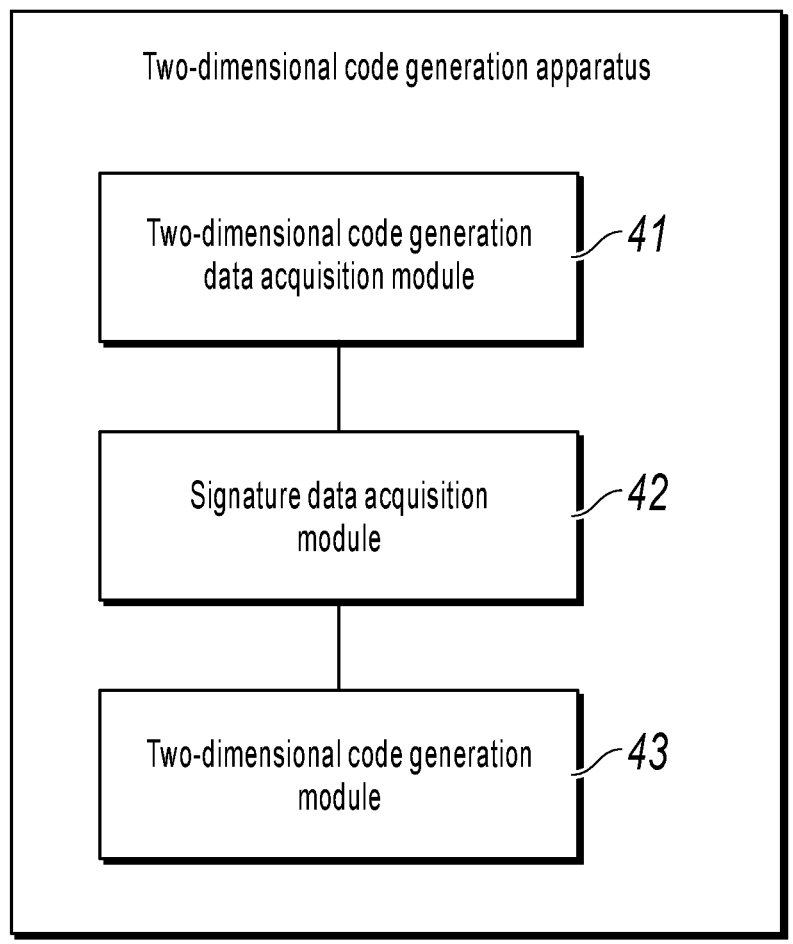
FIG. 4 is a schematic diagram illustrating a two-dimensional code generation apparatus, according to a third aspect of the embodiments of the present specification.

According to a third aspect, some embodiments of the present specification provide a two-dimensional code generation apparatus. As shown in FIG. 4, a secure element is disposed in the two-dimensional code generation apparatus, and the two-dimensional code generation apparatus includes: a two-dimensional code generation data acquisition module 41, configured to obtain two-dimensional code generation data when a two-dimensional code generation request is received, where the two-dimensional code generation data includes account data of a user corresponding to the electronic device and timestamp data of the electronic device; a signature data acquisition module 42, configured to obtain signature data based on a predetermined signature algorithm stored in the secure element; and a two-dimensional code generation module 43, configured to generate a target two-dimensional code based on the two-dimensional code generation data and the signature data.

In some optional embodiments, the apparatus further includes: a first acquisition module, configured to obtain to-be-signed data; and the signature data acquisition module includes: a second acquisition module, configured to obtain the signature data by adding a digital signature to the to-be-signed data based on the predetermined signature algorithm.

In some optional embodiments, when the predetermined signature algorithm is a public key infrastructure-based signature algorithm, the first acquisition module includes: a private key acquisition module, configured to obtain a private key generated by the secure element; and a first processing module, configured to obtain the signature data by adding the digital signature to the to-be-signed data based on the private key.

In some optional embodiments, when the predetermined signature algorithm is an encryption-based one-time signature algorithm, the signature data acquisition module 42 includes: a second processing module, configured to obtain a one-time encryption password based on a shared key stored in the secure element, where the one-time encryption password is the signature data.

In some optional embodiments, the apparatus further includes: a third processing module, configured to generate a one-time encryption password based on a shared key stored in the secure element; and the two-dimensional code generation module includes: a fourth processing module, configured to generate the target two-dimensional code based on the two-dimensional code generation data, the signature data, and the one-time encryption password.

For the previous apparatus, specific functions of the modules are described in detail in the embodiment of the two-dimensional code generation method provided in the embodiments of the present specification, and are not described in detail here.

Figure 5:
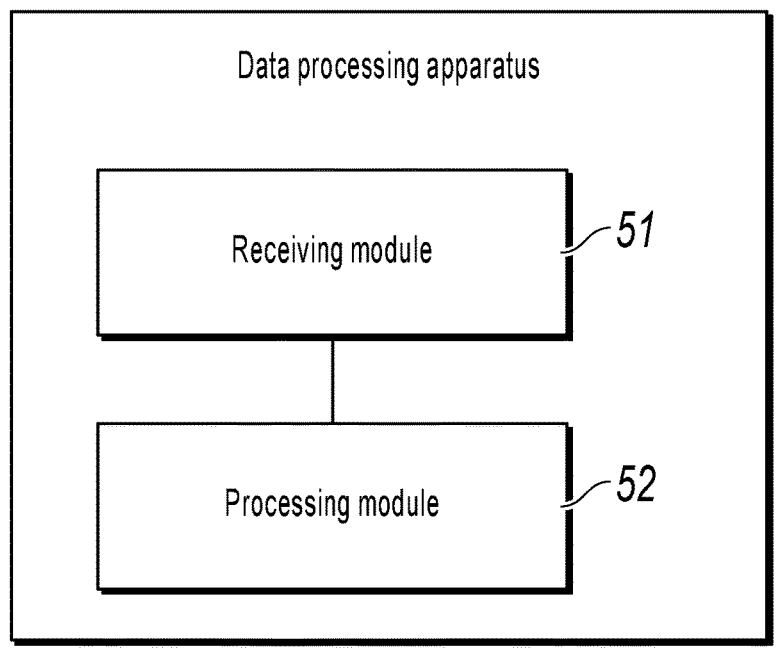
FIG. 5 is a schematic diagram illustrating a data processing apparatus, according to a fourth aspect of the embodiments of the present specification.

According to a fourth aspect, some embodiments of the present specification provide a data processing apparatus. As shown in FIG. 5, the data processing apparatus includes: a receiving module 51, configured to receive two-dimensional code scanning data obtained by scanning a target two-dimensional code through a target electronic device, where the target two-dimensional code is a two-dimensional code generated by using the two-dimensional code generation method provided in the first aspect of the embodiments of the present specification, and the two-dimensional code scanning data includes signature data and two-dimensional code generation data for generating the target two-dimensional code; and a processing module 52, configured to verify the signature data based on a signature method of the signature data to obtain a verification result.

Optionally, when the signature method is a public key infrastructure-based signature method, the processing module 52 includes: a first processing module, configured to verify the signature data based on a public key corresponding to the signature data to obtain the verification result.

Optionally, when the signature method is an encryption-based one-time signature method, the processing module 52 includes: a first acquisition module, configured to obtain a target one-time encryption password based on a shared key corresponding to the signature data; and a second processing module, configured to verify the signature data based on the target one-time encryption password to obtain the verification result.

Optionally, the data processing apparatus further includes: a second acquisition module, configured to obtain target timestamp data for receiving the two-dimensional code scanning data; a third acquisition module, configured to obtain initial timestamp data in the two-dimensional code generation data; and a third processing module, configured to determine whether the two-dimensional code is valid based on a target time difference between the target timestamp data and the initial timestamp data and a predetermined time difference, where it is determined that the target two-dimensional code is valid when the target time difference is less than or equal to the predetermined time difference, or it is determined that the target two-dimensional code is invalid when the target time difference is greater than the predetermined time difference.

Optionally, the apparatus further includes: a fourth acquisition module, configured to obtain account data in the two-dimensional code generation data when the verification result indicates a verification success; and a fourth processing module, configured to update an amount in the account data based on a collection amount corresponding to a collection code.

For the previous apparatus, specific functions of the modules are described in detail in the embodiment of the data processing method provided in the embodiments of the present specification, and are not described in detail here.

According to a fifth aspect, based on the same inventive concept as the two-dimensional code generation method in the previous embodiment, the present specification further provides a two-dimensional code generation apparatus. The two-dimensional code generation apparatus includes a memory, a processor, and a computer program that is stored in the memory and can run on the processor. When the processor executes the program, any method step of the two-dimensional code generation method is implemented.

Figure 6:
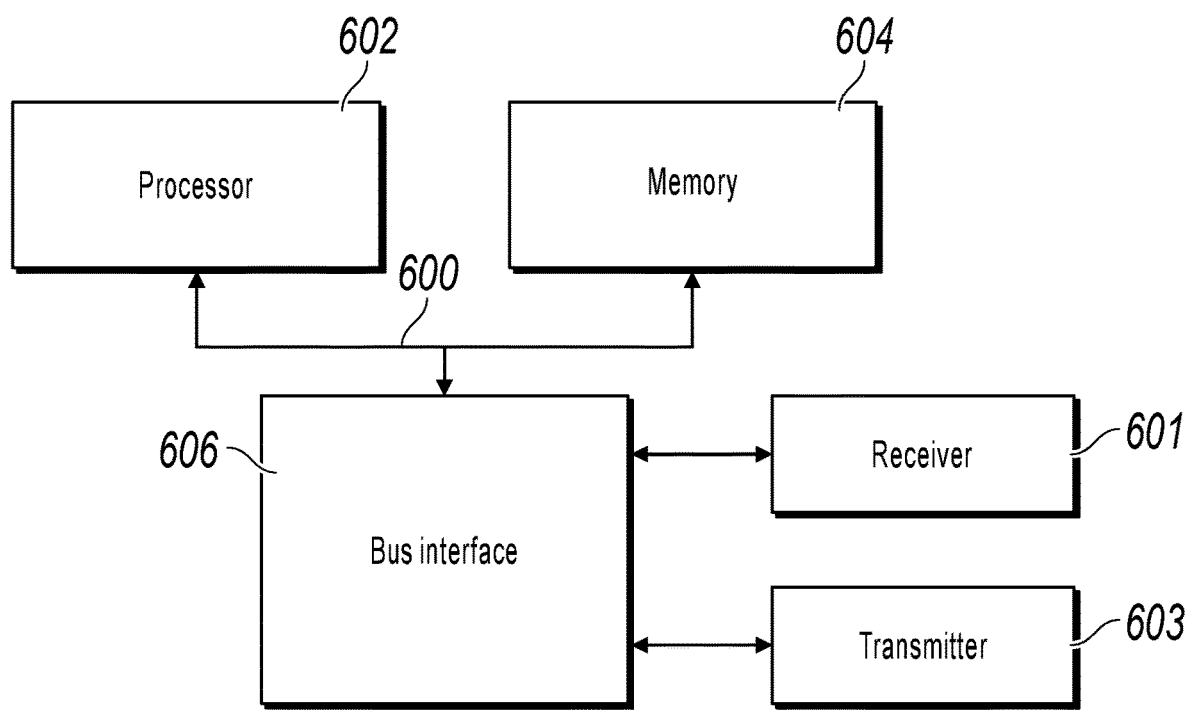
FIG. 6 is a schematic diagram illustrating a server, according to some embodiments of the present specification.

According to a sixth aspect, based on the same inventive concept as the data processing method in the previous embodiment, the present specification further provides a server. As shown in FIG. 6, the server includes a memory 604, a processor 602, and a computer program that is stored in the memory 604 and can run on the processor 602. When the processor 602 executes the program, any method step of the data processing method is implemented.

In FIG. 6, there is a bus architecture (represented by a bus 600). The bus 600 can include any number of interconnected buses and bridges. The bus 600 links together various circuits including one or more processors represented by the processor 602 and one or more memories represented by the memory 604. The bus 600 can also link other circuits such as a peripheral device, a voltage regulator, and a power management circuit. These other circuits are well-known in the art and therefore are not further described here. A bus interface 606 provides an interface between the bus 600 and each of a receiver 601 and a transmitter 603. The receiver 601 and the transmitter 603 can be the same element, namely, a transceiver, providing units for communicating with various other devices on a transmission medium. The processor 602 is responsible for managing the bus 600 and normal processing, and the memory 604 can be configured to store data used by the processor 602 to perform an operation.

According to a seventh aspect, based on the inventive concept of the two-dimensional code generation method and the data processing method in the previous embodiments, the present specification further provides a computer-readable storage medium. The computer-readable storage medium stores a computer program. When the program is executed by a processor, the steps of either the two-dimensional code generation method or the data processing method are implemented.

The present specification is described with reference to the flowcharts and/or block diagrams of the method, the device (system), and the computer program product based on the embodiments of the present specification. It should be understood that computer program instructions can be used to implement each process and/or each block in the flowcharts and/or the block diagrams and a combination of processes and/or blocks in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate a device for implementing a specific function in one or more processes in the flowcharts and/or in one or more blocks in the block diagrams.

These computer program instructions can be stored in a computer-readable memory that can instruct a computer or another programmable data processing device to work in a specific way, so that the instructions stored in the computer-readable memory generate an artifact that includes an instruction device. The instruction device implements a specific function in one or more processes in the flowcharts and/or in one or more blocks in the block diagrams.

These computer program instructions can be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the preferred embodiments of the present specification are described, a person skilled in the art can make additional changes and modifications to these embodiments once the person understands the basic creative concept. Therefore, the appended claims are intended to be construed as including the preferred embodiments and all the changes and modifications falling within the scope of the present specification.

Clearly, a person skilled in the art can make various modifications and variations to the present specification without departing from the spirit and scope of the present specification. Therefore, if these modifications and variations of the present specification fall within the scope of the claims of the present specification and its equivalent techniques, the present specification is also intended to include these modifications and variations.

What is claimed is:
1. A computer-implemented method, comprising:
receiving, by an electronic device, a two-dimensional code generation request from a user associated with the electronic device, the electronic device comprising a secure element;

obtaining, by the electronic device, two-dimensional code generation data, wherein the two-dimensional code generation data comprises account data of the user and timestamp data of the electronic device;

obtaining, by the electronic device, signature data based on a predetermined signature algorithm stored in the secure element; and generating, by the electronic device, a target two-dimensional code based on the two-dimensional code generation data and the signature data.

2. The computer-implemented method of claim 1, wherein, before obtaining the signature data based on the predetermined signature algorithm stored in the secure element, the computer-implemented method further comprises:

obtaining to-be-signed data; and obtaining the signature data based on the predetermined signature algorithm stored in the secure element comprises: obtaining the signature data by adding a digital signature to the to-be-signed data based on the predetermined signature algorithm.

3. The computer-implemented method of claim 2, wherein, when the predetermined signature algorithm is a public key infrastructure-based signature algorithm, obtaining the signature data by adding the digital signature to the to-be-signed data based on the predetermined signature algorithm comprises:

obtaining a private key generated by the secure element; and obtaining the signature data by adding the digital signature to the to-be-signed data based on the private key.

4. The computer-implemented method of claim 3, wherein, after obtaining the signature data by adding the digital signature to the to-be-signed data based on the private key, the computer-implemented method further comprises:

generating a one-time encryption password based on a shared key stored in the secure element; and generating the target two-dimensional code based on the two-dimensional code generation data and the signature data comprises: generating the target two-dimensional code based on the two-dimensional code generation data, the signature data, and the one-time encryption password.

5. The computer-implemented method of claim 1, wherein, when the predetermined signature algorithm is an encryption-based one-time signature algorithm, obtaining the signature data based on the predetermined signature algorithm stored in the secure element comprises:

obtaining a one-time encryption password based on a shared key stored in the secure element, wherein the one-time encryption password is the signature data.

6. The computer-implemented method of claim 1, further comprising:

receiving, by a second electronic device, two-dimensional code scanning data obtained by scanning the target two-dimensional code, wherein the two-dimensional code scanning data comprises the signature data and the two-dimensional code generation data for generating the target two-dimensional code; and obtaining, by the second electronic device, a verification result of the signature data based on a signature method of the signature data.

7. The computer-implemented method of claim 6, wherein, after receiving the two-dimensional code scanning data obtained by scanning the target two-dimensional code, the computer-implemented method further comprises:

obtaining target timestamp data for receiving the two-dimensional code scanning data;

obtaining initial timestamp data in the two-dimensional code generation data; and determining whether the target two-dimensional code is valid based on a target time difference between the target timestamp data and the initial timestamp data and a predetermined time difference, wherein it is determined that the target two-dimensional code is valid when the target time difference is less than or equal to the predetermined time difference, or it is determined that the target two-dimensional code is invalid when the target time difference is greater than the predetermined time difference.

8. The computer-implemented method of claim 6, wherein, when the target two-dimensional code is a collection code, after obtaining the verification result, the computer-implemented method further comprises:

obtaining account data in the two-dimensional code generation data when the verification result indicates a verification success; and updating an amount in the account data based on a collection amount corresponding to the collection code.

9. A non-transitory, computer-readable medium storing one or more instructions executable by a computer system to perform operations comprising:

receiving, by an electronic device, a two-dimensional code generation request from a user associated with the electronic device, the electronic device comprising a secure element;

obtaining, by the electronic device, two-dimensional code generation data, wherein the two-dimensional code generation data comprises account data of the user and timestamp data of the electronic device;

obtaining, by the electronic device, signature data based on a predetermined signature algorithm stored in the secure element; and generating, by the electronic device, a target two-dimensional code based on the two-dimensional code generation data and the signature data.

10. The non-transitory, computer-readable medium of claim 9, wherein, before obtaining the signature data based on the predetermined signature algorithm stored in the secure element, the operations further comprise:

obtaining to-be-signed data; and obtaining the signature data based on the predetermined signature algorithm stored in the secure element comprises: obtaining the signature data by adding a digital signature to the to-be-signed data based on the predetermined signature algorithm.

11. The non-transitory, computer-readable medium of claim 10, wherein, when the predetermined signature algorithm is a public key infrastructure-based signature algorithm, obtaining the signature data by adding the digital signature to the to-be-signed data based on the predetermined signature algorithm comprises:

obtaining a private key generated by the secure element; and obtaining the signature data by adding the digital signature to the to-be-signed data based on the private key.

12. The non-transitory, computer-readable medium of claim 11, wherein, after obtaining the signature data by adding the digital signature to the to-be-signed data based on the private key, the operations further comprise:

generating a one-time encryption password based on a shared key stored in the secure element; and generating the target two-dimensional code based on the two-dimensional code generation data and the signature data comprises: generating the target two-dimensional code based on the two-dimensional code generation data, the signature data, and the one-time encryption password.

13. The non-transitory, computer-readable medium of claim 9, wherein, when the predetermined signature algorithm is an encryption-based one-time signature algorithm, obtaining the signature data based on the predetermined signature algorithm stored in the secure element comprises:

obtaining a one-time encryption password based on a shared key stored in the secure element, wherein the one-time encryption password is the signature data.

14. The non-transitory, computer-readable medium of claim 9, wherein the operations further comprise:

receiving, by a second electronic device, two-dimensional code scanning data obtained by scanning the target two-dimensional code, wherein the two-dimensional code scanning data comprises the signature data and the two-dimensional code generation data for generating the target two-dimensional code; and obtaining, by the second electronic device, a verification result of the signature data based on a signature method of the signature data.

15. The non-transitory, computer-readable medium of claim 14, wherein after receiving the two-dimensional code scanning data obtained by scanning the target two-dimensional code, the operations further comprise:

obtaining target timestamp data for receiving the two-dimensional code scanning data;

obtaining initial timestamp data in the two-dimensional code generation data; and determining whether the target two-dimensional code is valid based on a target time difference between the target timestamp data and the initial timestamp data and a predetermined time difference, wherein it is determined that the target two-dimensional code is valid when the target time difference is less than or equal to the predetermined time difference, or it is determined that the target two-dimensional code is invalid when the target time difference is greater than the predetermined time difference.

16. The non-transitory, computer-readable medium of claim 14, wherein when the target two-dimensional code is a collection code, after obtaining the verification result, the operations further comprise:

obtaining account data in the two-dimensional code generation data when the verification result indicates a verification success; and updating an amount in the account data based on a collection amount corresponding to the collection code.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

receiving, by an electronic device, a two-dimensional code generation request from a user associated with the electronic device, the electronic device comprising a secure element;

obtaining, by the electronic device, two-dimensional code generation data, wherein the two-dimensional code generation data comprises account data of the user and timestamp data of the electronic device;

obtaining, by the electronic device, signature data based on a predetermined signature algorithm stored in the secure element; and generating, by the electronic device, a target two-dimensional code based on the two-dimensional code generation data and the signature data.

18. The computer-implemented system of claim 17, wherein, before obtaining the signature data based on the predetermined signature algorithm stored in the secure element, the operations further comprise:

obtaining to-be-signed data; and obtaining the signature data based on the predetermined signature algorithm stored in the secure element comprises: obtaining the signature data by adding a digital signature to the to-be-signed data based on the predetermined signature algorithm.

19. The computer-implemented system of claim 18, wherein, when the predetermined signature algorithm is a public key infrastructure-based signature algorithm, obtaining the signature data by adding the digital signature to the to-be-signed data based on the predetermined signature algorithm comprises:

obtaining a private key generated by the secure element; and obtaining the signature data by adding the digital signature to the to-be-signed data based on the private key.

20. The computer-implemented system of claim 19, wherein, after obtaining the signature data by adding the digital signature to the to-be-signed data based on the private key, the operations further comprise:

generating a one-time encryption password based on a shared key stored in the secure element; and generating the target two-dimensional code based on the two-dimensional code generation data and the signature data comprises: generating the target two-dimensional code based on the two-dimensional code generation data, the signature data, and the one-time encryption password.

* * * * *